March 29, 1932.  E. F. OYSTER  1,851,321

MOLDING MACHINE

Filed Oct. 17, 1929  5 Sheets-Sheet 1

INVENTOR.
Earl F. Oyster
BY
Fay Oberlin & Fay
ATTORNEYS.

March 29, 1932.  E. F. OYSTER  1,851,321

MOLDING MACHINE

Filed Oct. 17, 1929  5 Sheets-Sheet 3

INVENTOR.
Earl F. Oyster
BY
Ray Oberlin & Ray
ATTORNEYS.

March 29, 1932. E. F. OYSTER 1,851,321
MOLDING MACHINE
Filed Oct. 17, 1929 5 Sheets-Sheet 4

INVENTOR.
Earl F. Oyster
BY
Day Oberlin & Day
ATTORNEYS

March 29, 1932.  E. F. OYSTER  1,851,321

MOLDING MACHINE

Filed Oct. 17, 1929  5 Sheets-Sheet 5

INVENTOR.
Earl F. Oyster

ATTORNEYS.

Patented Mar. 29, 1932

1,851,321

UNITED STATES PATENT OFFICE

EARL F. OYSTER, OF SHAKER HEIGHTS, OHIO, ASSIGNOR TO THE OSBORN MANUFACTURING COMPANY, OF CLEVELAND, OHIO, A CORPORATION OF OHIO

MOLDING MACHINE

Application filed October 17, 1929. Serial No. 400,238.

The present invention relates, as indicated, to molding machines, and has more particular relation to means for rendering more efficient the operation of a jolt table or a jolt squeeze machine. One of the objects of the present invention is to provide improved means for equalizing the strokes of the elements of a drawing device. Another object is to provide a machine wherein the possibility of an uncushioned fall of the jolt table is eliminated, this feature forming the subject matter of a division of the present application, Serial No. 484,004 filed September 24, 1930. Further objects of the invention will appear as the description proceeds. To the accomplishment of the foregoing and related ends, said invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1:
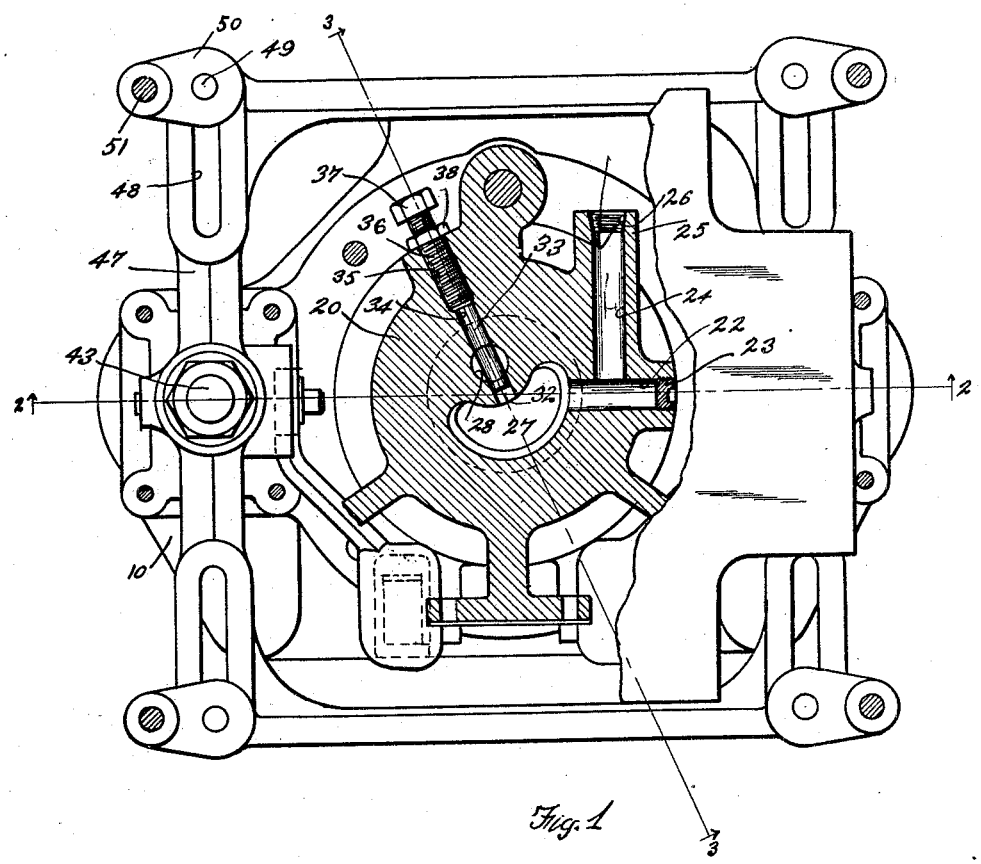
Figure 2:
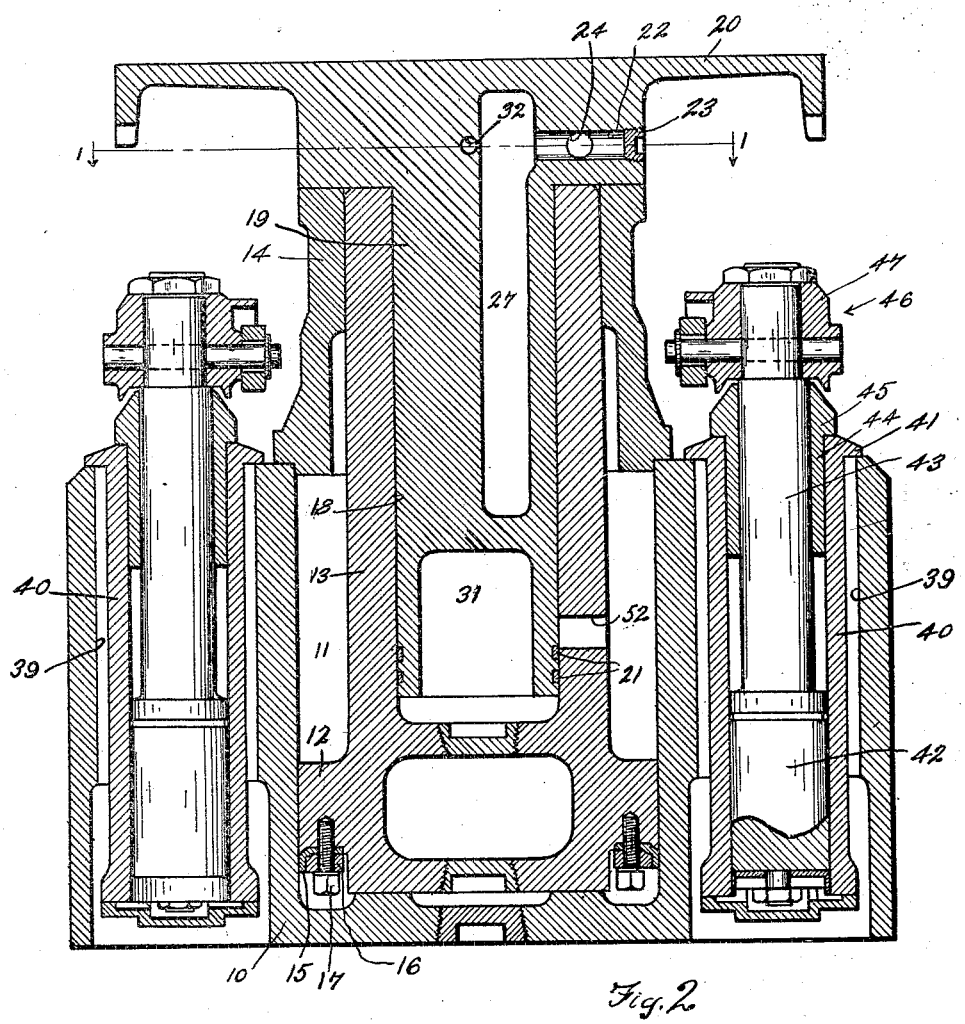
Figure 3:
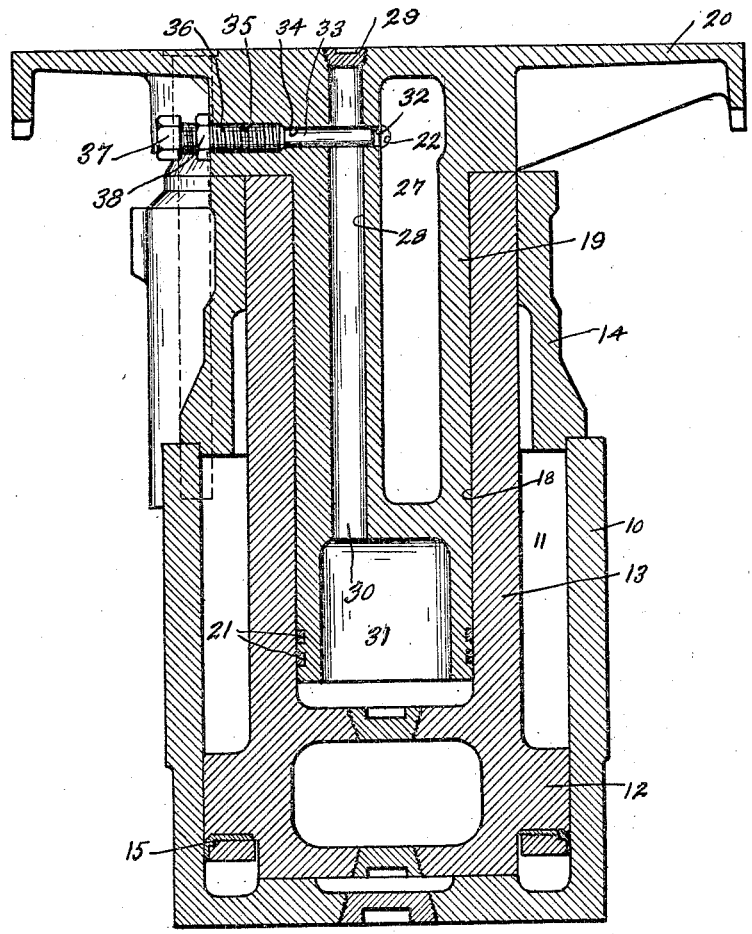
Figure 4:
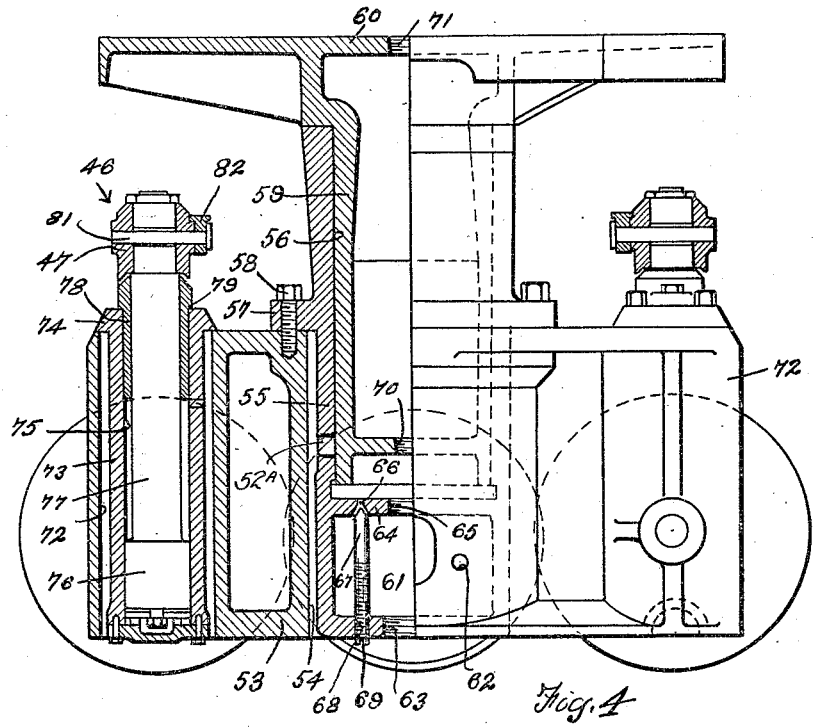
Figure 7:
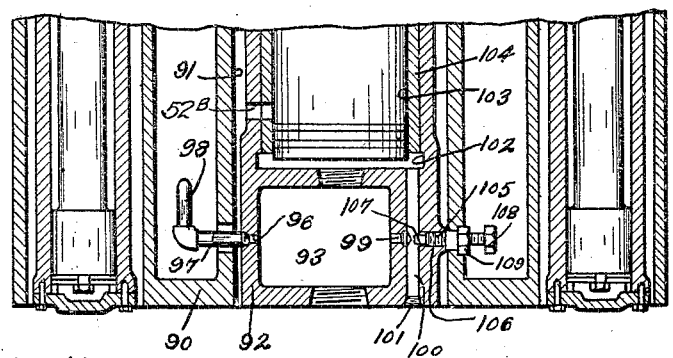
Figure 5:
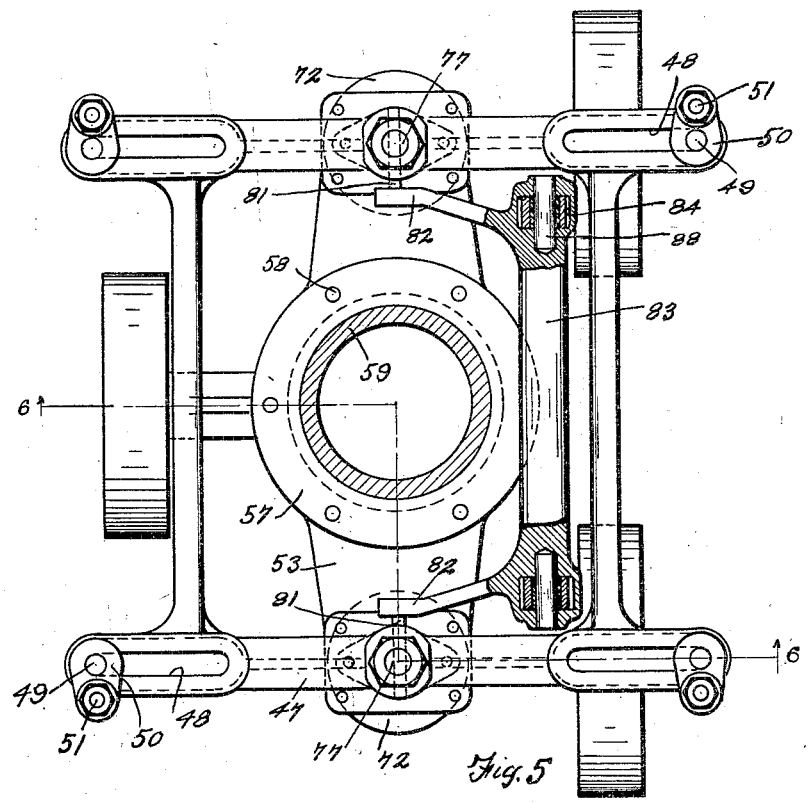
Figure 6:
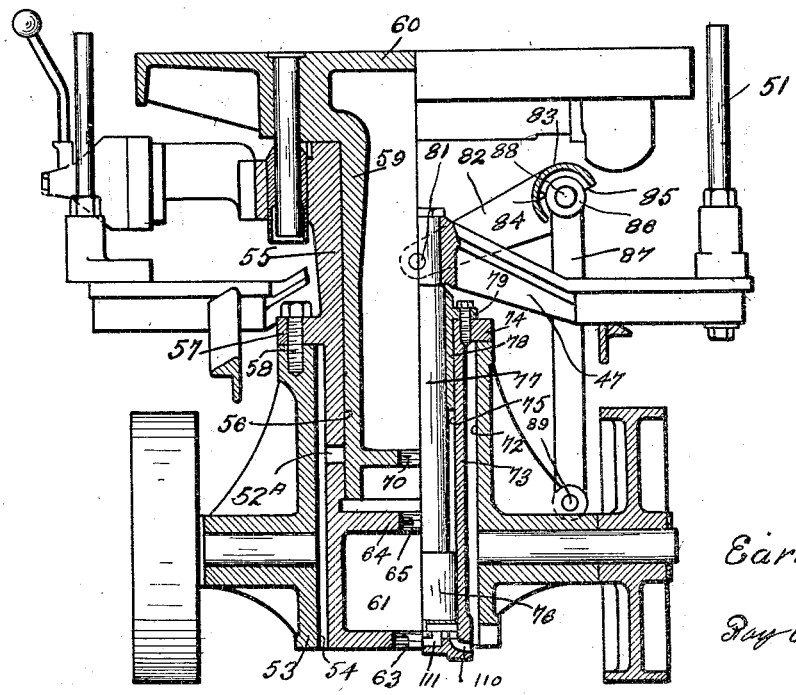

In said annexed drawings:

Fig. 1 is a horizontal section through a machine constructed in accordance with my invention, such section being taken substantially upon the line 1—1 of Fig. 2; Fig. 2 is a vertical section of said machine taken substantially upon the line 2—2 of Fig. 1; Fig. 3 is a vertical section taken substantially upon the line 3—3 of Fig. 1; Fig. 4 is a side elevation, partly in section, of a modification of the machine disclosed in Figs. 1 to 3; Fig. 5 is a horizontal section of the device of Fig. 4; Fig. 6 is a section taken substantially upon the line 6—6 of Fig. 5; and Fig. 7 is a broken vertical section of a further modification.

Referring more particularly to Figs. 1 to 3, it will be seen that I have provided a base or frame 10 formed to provide a cylinder 11 in which is reciprocably mounted a squeeze piston 12, said piston being formed with a shank 13 extending upwardly and beyond the confines of the cylinder 11. The upper end of the shank 13 is enclosed and guided by a bonnet or shroud 14 mounted upon and secured to the base 10. A packing ring 15 of leather, or similar semi-flexible packing material is secured in place on the lower surface of the squeeze piston 12 by means of a ring 16 between which ring and the piston 12 the packing ring 15 is clamped by means of machine screws 17 or equivalent fastening means.

The shank 13 of the piston 12 is formed to provide therewithin a cylinder 18 in which is reciprocably mounted the shank 19 of a second piston which carries at its upper end a table 20. Said shank 19 is preferably formed adjacent its lower end with grooves for the reception of packing rings 21.

The table 20 is formed with a passage 22 opening through its periphery, and adapted to be closed by a plug 23. Said passage 22 is intersected by a second passage 24 which opens at its outer end through a stud 25, which is interiorly threaded at 26 for the reception of a flexible pipe or hose. At its end opposite the end which is closed by the plug 23, the passage 22 opens into a chamber 27 formed in the piston 19 and extending longitudinally thereof from a point adjacent the upper surface of the table 20 to a point adjacent the lower end of the shank 19. Said chamber 27 is paralleled by a comparatively small passage 28 which extends throughout the length of the piston 19, the upper end thereof opening through the upper surface of the table 20 and being adapted to be closed by a plug 29, and the lower end 30 thereof opening into a socket or recess 31 in the lower end of the shank 19, said recess being in open communication with the cylinder 18. A port 32 adjacent the upper end of the chamber 27 provides for communication between said chamber 27 and said passage 28.

Preferably, the port 32 is controllable through the means of a valve 33 mounted in a bore 34 in said table 20. The outer end of the bore 34 is enlarged and is interiorly threaded as at 35 for cooperation with a threaded portion 36 of the valve 33. Means are provided for adjusting the valve 33, and in the illustrated embodiment, such means comprises a polygonal head 37 upon said valve member, whereby said valve member can be rotated to move the same inwardly or outwardly. A lock nut 38 may be provided for holding said valve 33 in adjusted position.

On opposite sides of the cylinder 11, the base 10 is provided with a pair of sockets 39 in which are received cylinders 40, each of said cylinders being provided with shoulders 41 adapted to rest on and be secured to the upper surface of the base 10. Reciprocably mounted in each of the cylinders 40 is a piston 42 having a shank 43 extending upwardly through a bushing 44 having a shoulder 45 adapted to be secured to the upper portion of the cylinder 40. Equalizing mechanism, indicated generally at 46, and to be described in detail hereinafter, is secured to the upper ends of the shanks 43.

It will be seen that the organization above described comprises a jolt squeeze mechanism. In operation, a mold is placed upon the table 20 and is first jolted by operation of the piston 19 and is thereafter moved up by operation of the piston 12 into contact with a squeeze head (not shown). The piston 19 is operated by admitting air under pressure through the connection 26 and passage 24. The air flows through the passage 24 and the passage 22 into the chamber 27. It passes through the port 32 and past the valve 33 into the passage 28, and so into the cylinder 18 beneath the piston 19. The air in said cylinder forces the piston upwardly until the lower end of said piston passes the port 52, at which time air escapes through said port 52 at a rate faster than it can flow past the valve 33, and so the piston 19 is permitted again to fall. As long as air under pressure is being supplied to the passage 24, there is no possibility of the piston 19 falling without an air cushion, as it will be seen that the bottom of the stroke of said piston is not reached until some time after the port 52 has been closed. If, however, the supply of air to the passage 24 is cut off just as the piston has completely opened the port 52, in the absence of the special means provided herein, the piston would fall practically without any cushion. Because of the means comprising the chamber 27 and the valve 33, however, if the supply of air to the passage 24 is cut off at the time indicated, there still remains in the passage 27 a body of air under pressure, and this air continues to bleed past the valve 33 even after the supply has been cut off. As a consequence, a cushion of air is forced into the cylinder 18 before the piston 19 can fall to the bottom of its stroke and thus an uncushioned fall of the piston 19 is prevented.

Referring now to the modification disclosed in Figs. 4 to 6, it will be seen that I have provided a base 53 in which is formed a socket 54 which receives a sleeve 55 formed to provide a cylinder 56, said sleeve being formed intermediate its ends with an annular shoulder 57 adapted to rest upon the upper surface of the base 53 and to be secured thereto by means of machine screws 58 or other fastening means. Within the cylinder 56 there is reciprocably mounted a piston 59 carrying at its upper end a table 60.

The sleeve 55 is formed to provide beneath the lower extremity of the cylinder 56 a chamber 61, and a port 62 is formed in said sleeve providing communication with the chamber 61 and adapted to receive a pipe leading from a source of air or other fluid under pressure. The bottom wall of the chamber 61 is formed with an aperture 63 adapted to be closed by a plug, and the wall 64 dividing said chamber 61 from the cylinder 56 is provided with a similar opening 65 likewise adapted to be closed by a plug. The wall 64 is further formed with a small port 66 adapted to be controlled by a valve 67 comprising a member threaded through a threaded aperture 68 in the bottom wall of the chamber 61. Means for adjusting the position of the valve 67 from the outside of the machine is preferably provided, and such means in the illustrated embodiment comprises simply a kerf 69 in the projecting end of the member 67. The piston 59 is provided in its lower end with an opening 70 and in its upper end with a similar opening 71, both of said openings being adapted to be closed by plugs. The operation of the piston 59 is similar to that described for piston 19, namely, air admitted through the port 66 raises the piston until the exhaust port 52$^A$ is cleared, whereupon the air escapes faster than it is supplied through the port, and the piston falls. The recess in the bottom of the piston, together with the larger chamber 61, provides for the retention of air to cushion the fall of the piston, in the same manner as described for the form of Fig. 2, even if the source of air supply fails.

The device disclosed in Figs. 4 to 6 is provided with flask-lifting means substantially identical with that disclosed in the device of Figs. 1 to 3. Thus, the base 53 is provided at opposite sides of the socket 54 with similar parallel sockets 72 each of which is adapted to receive a casing 73. Each of said casings is formed with a shoulder 74 adapted to rest on and be secured to the upper surface of the base 53 by any desired means. Each of the casings 73 is formed to provide a cylinder 75 in which is reciprocably mounted a piston 76 having a shank 77 extending upwardly through a bushing 78, said bushing being formed with a shoulder 79 through the medium of which said bushing is secured to the upper surface of the casing 73.

Secured to each of said shanks 77 is a bar 47, each of said bars comprising oppositely extending arms and said bars being parallel with each other. At its outer extremity, each of said arms is formed with a longitudinally extending slot 48 in which is adjustably mounted a pin 49. Each of said pins clamps in place a member 50 carrying an upwardly projecting rod 51. As is clearly shown in Fig. 6, the rods 51 normally extend to a level just above the surface of a table 60. Inlet and exhaust passages 110 and 111 are provided in the bases of the casings 73 whereby fluid under pressure may be introduced to and exhausted from the cylinders 75 to elevate the pistons 76 or to permit them to fall. It will be obvious that it is essential to equalize the movement of the two pistons 76 in order that, as the rods 51 elevate the flask off the table 60, the same shall move properly to prevent damaging of the mold. Such equalizing means is best illustrated in Figs. 5 and 6.

The pins 81 which secure the bars 47 to the shanks 77 secure to each of said shanks also one of a pair of arms 82, said arms being rigid with a bar 83. Said bar 83 is provided adjacent its opposite ends with sockets 84, said sockets being open only at their under sides 85 so that the socket tops form hoods to protect their respective pivots from falling sand and dirt. In each of said sockets is secured the upper end 86 of one of a pair of links 87, by means of pins 88. As will be obvious, this arrangement provides a pivotal connection between the links 87 and the bar 83, whereby the bar is supported. The lower end of each of said links 87 is pivoted to the base 53 by means of a pin 89, the axes of said pins 89 being aligned, and being parallel with the axes of the pins 88. It will be clear that this arrangement positively assures equalization of the strokes of the two pistons 77.

It will be noted that the links 87 are of such length that the bar 83 and the pivotal connections of said links to said bar are disposed at a level just below the table 60, whereby the moving parts are kept out of any sand or dirt which may collect upon the floor on which the machine is mounted. It will further be noted that the pivotal connections between the links 87 and the bar 83 are well protected against sand or other dirt falling upon them from above.

In Fig. 7 I have illustrated a further form of cushioning chamber. In this form I have shown a base 90 providing a socket 91 in which is mounted a sleeve 92 formed to provide a cushioning chamber 93 having a port 96 in one side wall thereof. Said port 96 is adapted to have connected thereto a coupling 97, said coupling being connected to a fluid pressure line 98. In the opposite side wall of the chamber 93 there is provided a second port 99 providing communication between the chamber 93 and the passage 100. Said passage opens at its one end 101 through the bottom of the base 90 and at its other end into a chamber 102 at the base of the cylinder 103 formed in the sleeve 92 by a bushing 104. Opposite the port 99, the sleeve 92 is formed with a threaded bore 105 in which is threaded the shank 106 of a valve member 107 adapted to control the port 99. Said shank is provided with a polygonal head 108 whereby the same may be adjusted, and a lock nut 109 is provided for securing the valve member in adjusted position.

The operation of the device disclosed in Fig. 7 is substantially equivalent to the operation of the device disclosed in Figs. 1 to 3, the exhaust port 52$^B$ allowing escape of air at the top of the piston stroke and the chambers 61 and 93 operating to prevent an uncushioned fall of the pistons.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

Equalizing means for a jolt and draw molding machine comprising in combination a pair of draw pistons, a pair of arms, a direct pivotal connection between each of said arms and its piston, a horizontal shaft common to and rigid with both of said arms, and floating pivotal supporting means for said shaft, said shaft and arms being immediately beneath and well in under the jolt table.

Signed by me this 9th day of October, 1929.

EARL F. OYSTER.